(12) United States Patent  (10) Patent No.: US 8,024,493 B2
Matzuzzi  (45) Date of Patent: Sep. 20, 2011

(54) STAND-ALONE PERSONAL PORTABLE DEVICE FOR TRANSMITTING AND RECEIVING A COMPUTER FILE BETWEEN TWO MOBILE PHYSICAL PEOPLE

(75) Inventor: Jérôme Matzuzzi, Lyons (FR)

(73) Assignee: Movitecnic, Lyon (FR)

( * ) Notice: Subject to any disclaimer, the term of this patent is extended or adjusted under 35 U.S.C. 154(b) by 294 days.

(21) Appl. No.: 11/813,513

(22) PCT Filed: Jan. 18, 2006

(86) PCT No.: PCT/FR2006/000113
§ 371 (c)(1),
(2), (4) Date: May 4, 2008

(87) PCT Pub. No.: WO2006/077318
PCT Pub. Date: Jul. 27, 2006

(65) Prior Publication Data
US 2009/0138622 A1    May 28, 2009

(30) Foreign Application Priority Data

Jan. 18, 2005  (FR) ...................... 05 00495

(51) Int. Cl.
G06F 3/00 (2006.01)
G06F 13/12 (2006.01)
(52) U.S. Cl. ................. 710/13; 710/14; 710/62; 710/74
(58) Field of Classification Search .................... 710/13, 710/14, 62, 74
See application file for complete search history.

(56) References Cited

U.S. PATENT DOCUMENTS
6,405,362 B1  6/2002 Shih et al.

(Continued)

FOREIGN PATENT DOCUMENTS
CN    1 361 483 A    7/2002

OTHER PUBLICATIONS

"What is FlashPoint" INET, [Online] Oct. 10, 2004, XP002354243, Retrieved from the Internet: URL:http://web.archive.org/web/20041010121832/www.starbursthomepage.com/xflashpointx.htm> retrieved on Nov. 16, 2004, the whole document.

(Continued)

*Primary Examiner* — Alford W Kindred
*Assistant Examiner* — David E Martinez
(74) *Attorney, Agent, or Firm* — Jackson Patent Law Office

(57) ABSTRACT

A system configured to transfer an electronic file includes a non-volatile storage memory; an autonomous power supply; a transfer system comprising a transmitter configured to transmit a file to be transmitted, the transmitter comprising a first contact connection port configured to enable mechanical fitting to a contact connection port of a second system, a receiver configured to receive a file, the receiver comprising a second contact connection port configured to enable mechanical fitting to another contact connection port of the second system, and a transmission control system configured to authorize or prohibit a transmission of an electronic file to the second system, the transmission control system including a system configured to recognize mechanical fitting to the second system. The non volatile storage memory is compartmentalized into a transmission memory zone configured to store a file to be transmitted, and a reception zone configured only for the reception or the storage of files; the receiver is configured to perform the reception into the reception memory zone; the transmitter of a file is configured to transmit a file contained in the transmission memory zone; and the transmission control system is configured to automatically start, at the recognition of mechanical fitting to the second system, the transmission of a copy of the file stored in the transmission memory zone, to a reception memory zone of the second system, a file stored in the reception zone of the second system being unable to be transmitted via the transmission system, thereby effecting a security function.

11 Claims, 4 Drawing Sheets

U.S. PATENT DOCUMENTS

| | | | |
|---|---|---|---|
| 7,511,233 B2* | 3/2009 | Pocrass | 174/541 |
| 2004/0204072 A1 | 10/2004 | Han et al. | |
| 2006/0028803 A1* | 2/2006 | Pocrass | 361/737 |
| 2006/0149895 A1* | 7/2006 | Pocrass | 711/103 |
| 2009/0019224 A1* | 1/2009 | Pocrass | 711/115 |

OTHER PUBLICATIONS

Mark Mitford: "FlashPoint USB Drive" INET, [Online] Oct. 22, 2004, XP002354244, Retrieved from the Internet: URL:http:www.shinyplastic.comiarchives/1022-04-storage-flashpoint-usb-drive.php>[retrieved on Nov. 16, 2005] the whole document.

Communication dated Nov. 7, 2008 from the Examining Division in corresponding European application 0670912.
Communication dated Mar. 4, 2010 from the Examining Division in corresponding Europeanm application 0670912.
International Search Report, May 9, 2006, from International Phase of the instant application.
English Translation of the Written Opinion of the International Search Authority, Jul. 24, 2007, from International Phase of the instant application.
English Translation of International Preliminary Report on Patentability Chapter I, Jul. 24, 2007, from International Phase of the instant application.

* cited by examiner

STAND-ALONE PERSONAL PORTABLE DEVICE FOR TRANSMITTING AND RECEIVING A COMPUTER FILE BETWEEN TWO MOBILE PHYSICAL PEOPLE

BACKGROUND OF THE INVENTION

In the current state of information interchanges, it is almost understood that a computer file transfer is performed from one fixed PC terminal to another fixed PC terminal. For this, various techniques are available, either via the Internet or via an Ethernet, Bluetooth or Wireless type local area network. Mobile-solution based computer file transfers exist only via expensive PDA or mobile telephony type solutions. Not being equipped with a dedicated transmission or reception function key, or a sending memory area, or systems according to the invention, they involve complex procedures that are impossible to implement simply and quickly between two people. Furthermore, the file or information transmitted is often not retained in its entirety.

SUMMARY OF THE INVENTION

There is a system configured to transfer an electronic file. The system comprises a non-volatile storage memory; a standalone power supply; and a transfer system comprising a transmitter configured to transmit a file to be transmitted, the transmitter comprising a first contact connection port configured to enable mechanical fitting to a contact connection port of a second system, a receiver configured to receive a file, the receiver comprising a second contact connection port configured to enable mechanical fitting to another contact connection port of the second system, and a transmission control system configured to authorize or prohibit a transmission of an electronic file to the second system, the transmission control system including a system configured to recognize mechanical fitting to the second system. The non volatile storage memory is compartmentalized into a transmission memory zone configured to store a file to be transmitted, and a reception zone configured only for the reception or the storage of files; the receiver is configured to perform the reception into the reception memory zone; the transmitter of a file is configured to transmit a file contained in the transmission memory zone; and the transmission control system is configured to automatically start, at the recognition of mechanical fitting to the second system, the transmission of a copy of the file stored in the transmission memory zone, to a reception memory zone of the second system, a file stored in the reception zone of the second system being unable to be transmitted via the transmission system, thereby effecting a security function.

We do not at the present time know of any device equivalent to the invention that is available on the market or already the subject of a patent.

DETAILED DESCRIPTION OF EXEMPLARY EMBODIMENTS OF THE INVENTION

Figure 1:
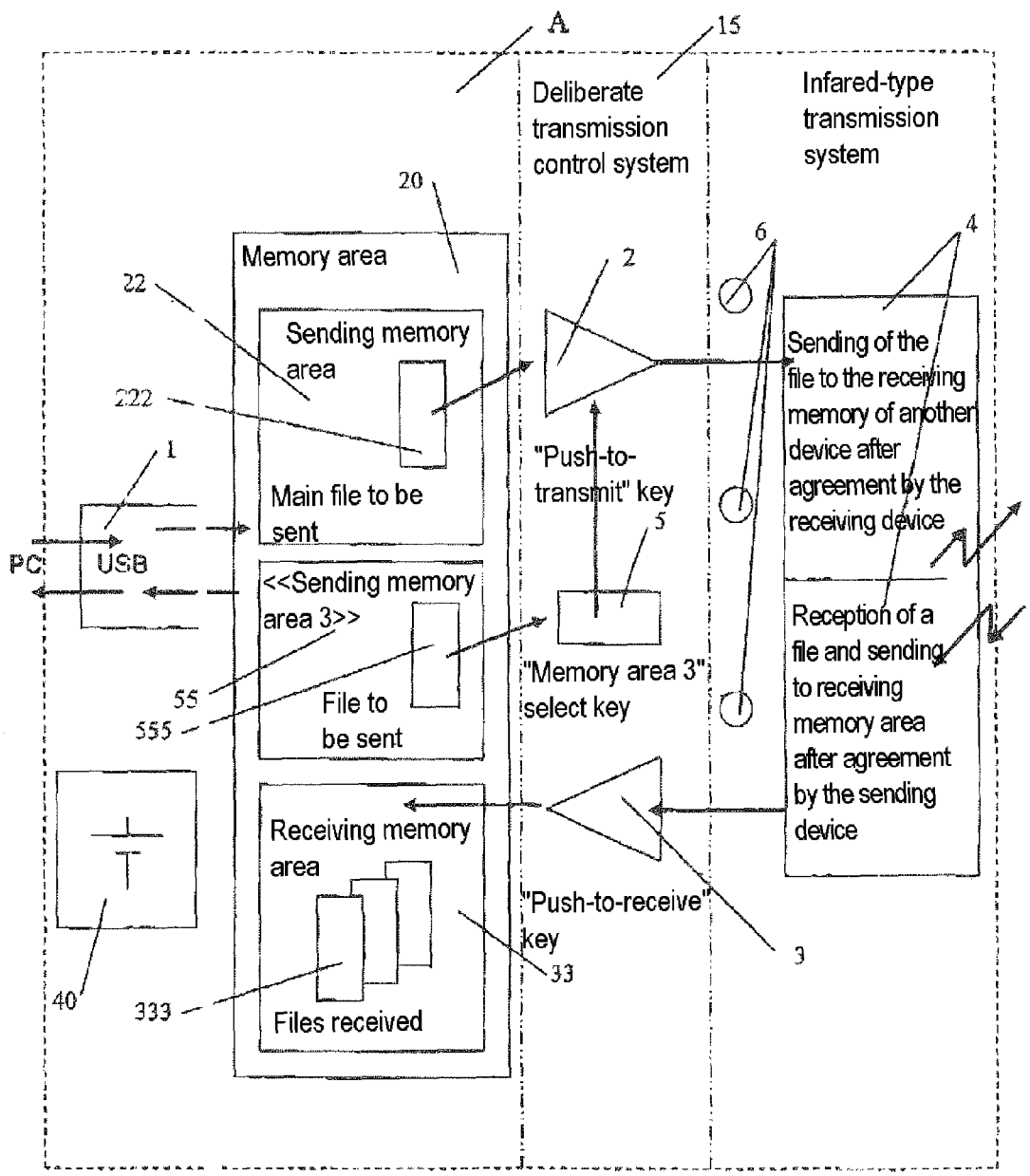
FIG. 1 represents the various internal functions of the device that are necessary for its mode of operation. The arrows indicate the directions of movement of a file following: activation of the deliberate transmission control system, sending or receiving by infrared or the loading/unloading of files with the PC using the USB port.

The present invention relates to a standalone portable device equipped with a USB (Universal Serial Bus) port enabling the device to be connected to a PC (Personal Computer), a transmission system having sending and receiving functions (with or without contact), a non-volatile memory area accessible via the USB port and partitioned into a minimum of two areas (the sending area and the receiving area), a power supply system making the device standalone and a deliberate transmission control system. The device enables a computer file to be transmitted or received between two companies or individuals, each equipped with a compatible device. The file to be sent is contained in the sending memory area of the device. It is transmitted by the sending system, involving a deliberate action on the transmission control system, to the receiving memory area of a second device, if, and only if, the second device (then the receiver), accepts by a deliberate action the reception of the file. The received file is then stored (in full) in the receiving memory of the second device. This is a copy of the original file which remains available in the sending area of the sending device.

The object of the device according to the invention is to provide a technical solution that is simple to use. It is designed so that a computer file can be exchanged or transmitted when two individuals or companies meet on the move. The computer user is on the move when he is outside his fixed work base and is no longer in contact with his PC. The device according to the invention also allows received files to be stored temporarily and carried around until they are downloaded into a personal computer or into the corporate customer relations management (CRM) information network, when the user returns to his fixed base.

With reference to these drawings, the device according to the invention described hereinafter is resident in an electronic device in the compact format of a simple, market-standard "USB key", and comprises the following various elements:

A USB serial port 1 for connecting the device to the USB socket on a PC. The PC then displays the content of a minimum of two separate memory areas 22 and 33 in which are stored, or distinctly marked, the main file 222 to be transmitted and the received files 333. The file 222 placed in the sending memory area 22 will be the file to be transmitted, the one received or placed in a receiving area 33 will be the received file 333, and it will be stored until it is processed. The user of the PC can thus place in the sending area 22 the file or files 222 that he wants, when he is on the move, to be able to transmit to a person having a compatible device. The user can retrieve the files 333 contained in the receiving area 33, in order to be able to use them, thanks to the direct access to the memory area 20 via the USB port once connected to his PC. The user can also place files to be stored in the receiving memory area 33. He must then create a folder containing the files to be stored, in order to avoid the risk of receiving a file that might have the same name and might overwrite a file already contained in the receiving memory area 33. Once connected to the PC, the memory areas 22 and 33 behave like external hard drives. The user can carry out the same operations as on any external hard drive (deleting, transferring, moving or copying the file or a folder containing files).

Figure 5:
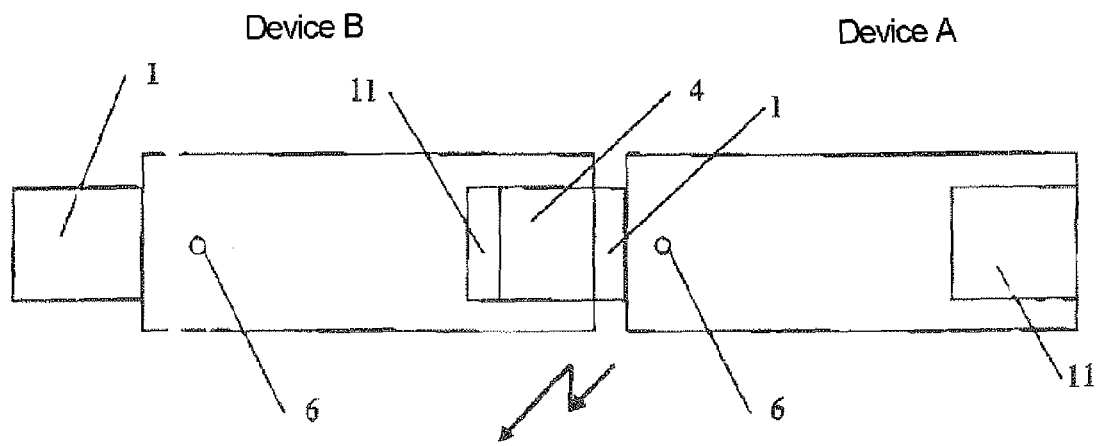
FIG. 5 represents a variant of the deliberate transmission control system, the functions of the keys giving the transmission or reception command being directly integrated in the transmission system based on a male/female type connection.

A built-in power source 40 providing the autonomy of the device once disconnected from the PC's USB port. This power source powers the device when transmitting or receiving a file. An on/off selection button can be added in order to save the power source. One of the buttons already available on the device can also perform this same function. In the case where the device is equipped only with a connection-based transmission system 4 incorporating the deliberate control system 15 and the recognition function 16 (FIG. 5), then the act of fitting together will automatically cause the device to be switched on. It will be switched off automatically when the transmission of the file is completed and at the end of a time delay. An indicator will indicate that the device is on.

Memory 20 is the physical area in which computer files or folders will be placed and stored. The files can be of any of the following exemplary computer format types: file.doc; *.doc; file.jpg; *.*; *.Jce; *.wab; *.vcf, and so on. The files and the information contained in them will be stored in a hard-type non-volatile memory area (a component soldered onto the electronic circuit of flash memory type) or in a removable memory of the memory card type (for example: chip card, compact flash, SIM card, "secure digital card"). The memory 20 is partitioned into at least two areas: a sending memory area 22 containing the main file to be transmitted 222, and a receiving memory area 33. The latter can have a larger size because it will also serve as a file storage area. It can be accessed by PC, involving connecting the device via its USB port 1 to the PC's USB port. The sending memory area 22 also provides a security function guaranteeing to the user that another device can receive, according to the principle of the invention, only a file placed or marked or pointed to in a sending area. A file stored in the receiving area cannot be transmitted by the transmission system 4. The device can be equipped with other sending memory areas 55 associated with other keys 5, dedicated to selecting these areas, their modes of operation being based on the same logic. The loss of power supply does not affect the files contained in the memory 20. In the case where the device has the "advanced selection system based on pointing to the file to be transmitted" option, the memory no longer needs to be partitioned, so this option replaces the partitioned memory function.

Figure 3:
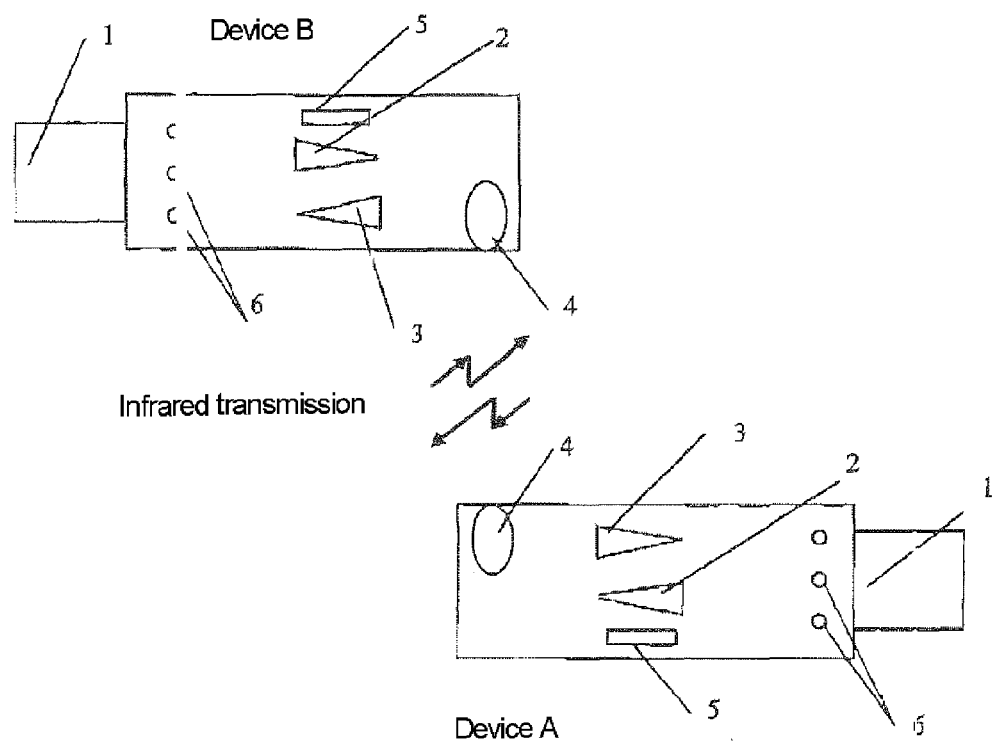
FIG. 3 represents two devices currently transmitting, according to the invention, equipped with "push-to-transmit" and "push-to-receive" keys enabling a file to be transmitted and received, and with an infrared-type transmission system.

A deliberate transmission control system is shown in FIG. 1 and FIG. 3. This comprises a minimum of two function keys. One, called "push-to-transmit" 2, is intended for sending or transmitting a file located in the sending area 22. The other, called "push-to-receive" 3, is intended for receiving a transmitted file. A function of the preset "push-to-transmit" key 2 type will automatically select the main file 222 to be transmitted contained in the sending memory area 22 and give the command to the transmission system 4 to transfer the file into the receiving area 33 of another device after checking that the other device accepts the receipt of the file in its receiving area 33. It is the "push-to-receive" key that allows the file transmitted into its receiving memory area 33 to be loaded. When a user equipped with a device A meets another user equipped with a compatible device B, he can, if he wants, transmit his file by pressing the "push-to-transmit" key 2. The file 222 stored in the device A will then be transmitted into the receiving memory area 333 of the device B subject only to the condition that the user of the device B presses the reception key 3 of the device B at the same time. The deliberate act of pressing on the "push-to-transmit" key on the sending device automatically generates the prompt requesting agreement for transmission to the receiving device. The positive response of the receiver involving pressing the "push-to-receive" key constitutes and guarantees the deliberate action allowing the file to be transmitted and received. A third key 5 will be used to select another file 555 to be transmitted stored in a possible third sending memory area 55. The system can be equipped with a number of sending memory area selection keys.

Variant of the deliberate transmission control system having only a single transmission key to perform both "push-to-transmit" and/or "push-to-receive" functions. When a user equipped with a device having only a single key meets another user equipped with a compatible device, they can, if they wish, have a file transmitted. Then, it is the first device to press the function key that becomes the sender. The second device receiving the request signal is the receiver. The receiver can then if he wants, confirm in turn his desire to receive by pressing the key, thus validating the receiving mode. If the device receives no signal asking it for its agreement to receive, it is then that one which can become the sender on activating the key.

Figure 2:
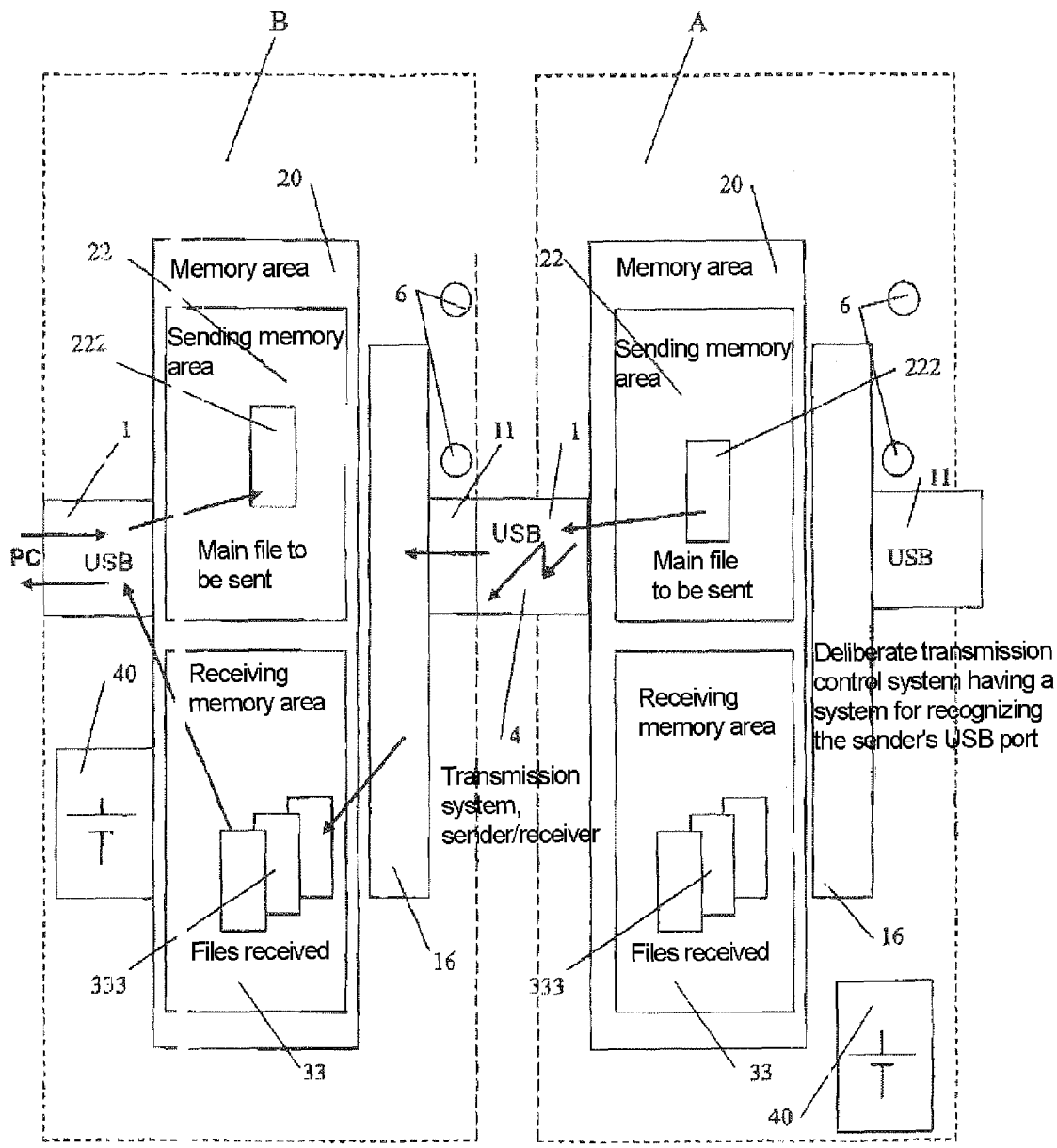
FIG. 2 represents the various internal functions, of a variant of the device, that are necessary for its mode of operation. The arrows indicate the direction of movement of a file when sent following the activation of the deliberate transmission control system (the result of a male/female connection between two devices), and the operations of loading/unloading files with the PC using the USB port.
Figure 4:
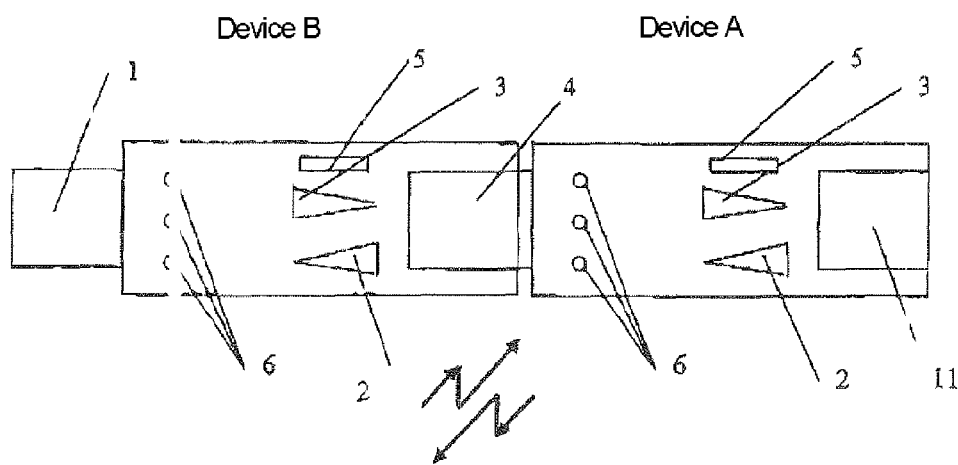
FIG. 4 represents a variant of the device equipped with the "push-to-transmit" and "push-to-receive" keys, enabling a file to be transmitted and received, and with a male/female connection-type transmission system.

Variant of the deliberate transmission control system (FIG. 2, FIG. 4 and FIG. 5), when a user equipped with a device A meets another user equipped with a compatible device B, they can, if they want, have a file transmitted. The deliberate transmission control action is implemented by fitting the male USB port 1 of the sending device A into the female port 11 of the receiving device B or vice-versa. Fitting a male USB port 1 into a female USB port 11 between two compatible devices then corresponds to the deliberate action which automatically enables the main file to be transmitted. In the case where the device has no predefined function key, we will define for convention (FIG. 2 and FIG. 5) the direction from sending memory 22 corresponding to the male USB port 1 to receiving memory 33 corresponding to the female USB port 11 (see FIG. 2). The female USB port 11 of a device according to the invention has a function 16 for recognizing the presence of the male USB port 1 of another device. It is this recognition function 16 which enables the automatic transmission via the transmission control system 15. This male/female connection is equivalent (if the device does not have keys) to the manual command by pressing the "push-to-transmit" keys for the sending device A and the manual command by pressing the "push-to-receive" keys for the receiving device B. It also signifies acceptance to receive. The file 222 stored in the device A will then be automatically transmitted into the receiving memory area 333 of the device B the conditions involving the deliberate system and pressing on the deliberate transmission control system are fulfilled according to the invention. This is also true when the device B becomes the sender and the device A becomes the receiver. The act of male/female connection performed between two devices will then be considered as activation of the deliberate control system and as the activation command for the transmission system 4. Its operation corresponds to the deliberate action on transmission of the main file.

A coding/decoding system: in order to reduce the time to send the file on infrared transmission or reception, the file can be subjected to an encoding. The encoding can be performed before the file is loaded into the sending memory area 22, by the software, or during its infrared transfer. Once the file is received, the file will be decoded on the fly before it is stored in receiving memory 33, or later, once retrieved in the PC using the software that will be delivered with the device.

A transmission system 4 (FIG. 3 and FIG. 4): the transmission of the file or files contained in a device A or B is performed very simply by means of the systems that automate the file transfer. The mode of operation of the file transfer device is still dictated by a reciprocal deliberate action. The sender A can successfully transmit his file 222 only if the receiver B presses the "push-to-receive" key on his device at the same time. The key must be kept pressed throughout the duration of the transmission, and an indicator 6 will indicate the end of the transmission to him. Conversely, the receiver can retrieve the file originating from the sending device only if the sender wants to transmit the file to him. The sending or receiving of the file from or to the memory area is done between two compatible or identical systems. By turns, a device can become either sender or receiver. The file is transferred in its entirety, and is identical before and after the transfer. With the file transfer then needing to be performed with total confidentiality, certain wireless or Bluetooth transmission devices cannot be used for the transmission of the file. The file 222 can be transmitted by infrared link or by direct connection (fitting together thus becoming a transmission means 4). The file 222 is then transmitted from a device A and received by another device B and stored in the receiving area 33. The technology that constitutes the transfer system will be chosen to correspond to the criteria of simplicity, cost and confidentiality according to the invention. The two technologies that correspond to these criteria are either infrared link, or male/female mechanical fitting together. A transmission system by infrared link has the benefit of being contactless, being able to be compatible with other components equipped with infrared links, but will have a lower transmission bit rate. The second solution is of fitting together type; it can be used to create a transmission system 4 and, for this, requires a second female USB-type connection port 11, and the transmission speed will be considerably faster, but this type of mechanical connection can be considered less reliable when the device is used intensively.

An indicator 6 type information system which can be associated with the sending key "push-to-transmit" 2 and receiving key "push-to-receive" 3: the indicators will serve to inform the user that the transmitted file has indeed been received, that it has been transmitted correctly or that the system is currently transferring the file. In the case of a device equipped with a number of sending memory areas, the indicators can be used to show the memory area that has been selected for sending. The indicators can be replaced by a more powerful information system of digital display or touch screen type or simply be incorporated in the key by light key means.

Figure 6:
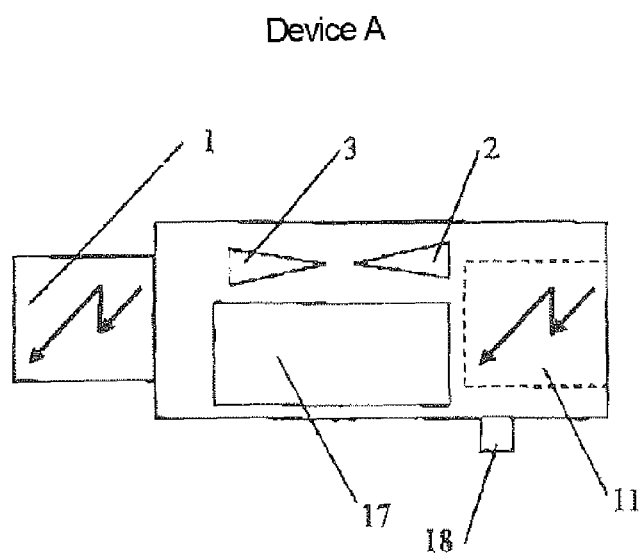
FIG. 6 represents a variant of the device equipped with a digital display which uses visual selection and an advanced key selection system to point to the file (marked) to be transmitted.

Optionally, the device can be equipped with an advanced selection system (FIG. 6) with a digital display 17 and a button 18 for pointing (with visual selection) to the file to be transmitted. The file is then selected in the memory area 20, the digital display displays the name of the file that will be transmitted. The file selected using the selection button (or pointing button) 18 is the file to be transmitted 222. The device equipped with an advanced selection function and a display can dispense with having two separate memory areas. However, retaining two memory areas, a sending area 22 and the other a receiving area 33, simplifies searching for and pointing to the file to be transmitted and ensures the security function and confidentiality. The sender seeks to transmit only the file or files contained in the sending area 22. The other files contained in the storage and receiving area 33 possibly being confidential files. The selection (or pointing) system can also enable a file to be moved from the receiving memory area 33 to the sending memory area 22, or vice-versa.

Typical application of the invention: the aim of the device is the transmission or reception of files in a simple and fast way. An exemplary application can be indicated which is directly applicable to the device according to the invention: the transmission of a file containing the data corresponding to that of a paper business card. The data concerning a user can be stored in a computer file so as to be transmitted simply and rapidly between two people at a trade show or at a meeting. The information can be transmitted either in a direction (customer=device(A)→supplier=device(B)) or a direction (supplier=device(B)→customer=device(A)) or in both directions (customer(A)→supplier(B)→customer (A)). The third key 5 can be used to select another stored file 555 of sales brochure type, to be transferred at a business meeting.

Other products based on this technology can be built: one example is an interactive terminal intended for storing data between customers and suppliers, at trade shows. The files transmitted by the customers equipped with a device can be retrieved, either by infrared or by fitting together, in an interactive terminal-type medium operating according to the inventive mode of operation. The terminal will collect a set of files. The terminal can be standalone and can store the information in a "Compact Flash or Smart Flash" type removable disk medium. The data can be used directly by the company by reading the content of this storage memory disk. Its interpretation will be facilitated by operating software delivered with the device or with the interactive terminal using the inventive mode of operation. Another exemplary novel application: it is possible to imagine a printer having a female USB port 11 equipped with a function 16 for recognizing the device according to the invention. When the male USB port 1 of the device is fitted into the female port of the printer. The device would prompt for authorization to transmit then would transmit to the printer the file contained in its sending memory 22. The printer would then directly print this file without needing to switch on or load the file on the PC. The device can also be used in industry by a machine user to transmit the file corresponding to a production type to a machine control system.

Software, delivered with the device, will make it possible to incorporate the data contained in the files. This data, once loaded in the PC, can be returned and incorporated, to a customer relations management (CRM) network. The result is a productivity increase because, since the file contains the information, there is no need for a repeat input of the information before it is integrated into a CRM network. The associated software will make it possible to consult and display the stored files, sort them, and organize certain data types.

According to other characteristics, the system for encoding/decoding or encoding/code-converting the file on sending or on receiving, implemented by the device, is intended either to reduce the file transfer time, or to supply the file 222 to a proprietary system or receive the file arriving from a proprietary system, of cellphone type, in a format that can be read by the latter. On arrival, the file should contain all the information that it contains on departure and is received in its entirety.

The invention claimed is:

1. A system configured to transfer an electronic file, the system comprising:
   a non-volatile storage memory;
   a standalone power supply;
   a transfer system comprising
      a transmitter configured to transmit a file to be transmitted, the transmitter comprising a first contact connection port configured to enable mechanical fitting to a contact connection port of a second system,
      a receiver configured to receive a file, the receiver comprising a second contact connection port configured to enable mechanical fitting to another contact connection port of the second system, and
      a transmission control system configured to authorize or prohibit a transmission of an electronic file to the second system, the transmission control system including a system configured to recognize mechanical fitting to the second system,
   wherein,
      the non volatile storage memory is compartmentalized into a transmission memory zone configured to store a file to be transmitted, and a reception zone configured only for the reception or the storage of files;
      the receiver is configured to perform reception into the reception memory zone;
      the transmitter is configured to transmit a file contained in the transmission memory zone; and
      the transmission control system is configured to automatically start, at the recognition of mechanical fitting to the second system, the transmission of a copy of the file stored in the transmission memory zone, to a reception memory zone of the second system, a file stored in the reception zone of the second system being unable to be transmitted via the transmission system, thereby effecting a security function.

2. A system according to claim 1 wherein the first contact connection port is type male and the second contact connection port is type female.

3. A system according to claim 1 wherein the first connection port is type USB male and the second contact connection port is type USB female.

4. A system according to claim 1 wherein the non-volatile storage memory includes a component soldered to a flash memory.

5. A system according to claim 1 wherein the non-volatile storage memory includes a removable memory card of the type SIM card, chip card, compact flash or other acting as an external hard drive.

6. A system according to claim 1 wherein the transmitter is configured to encode or to code-convert the file to be transmitted.

7. A system according to claim 1 wherein the standalone power supply is configured to automatically switch on in response to the recognition of mechanical fitting to the second system, and to automatically switch off after the end of file transmission and after a timeout.

8. A system according to claim 1, wherein the system is contained within an autonomous portable device.

9. A system according to claim 1, wherein the system is contained within an interactive terminal.

10. A system comprising a plurality of autonomous portable devices, each autonomous portable device having the form of a USB key, each autonomous portable device comprising:
   a non-volatile storage memory;
   a standalone power supply;
   a transfer system comprising
      a transmitter configured to transmit a file to be transmitted, the transmitter comprising a first contact connection port configured to enable mechanical fitting to a contact connection port of another autonomous portable device,
      a receiver configured to receive a file, the receiver comprising a second contact connection port configured to enable mechanical fitting to another contact connection port of the other autonomous portable device, and
      a transmission control system configured to authorize or prohibit a transmission of an electronic file to the other autonomous portable device, the transmission control system including a system configured to recognize mechanical fitting to the other autonomous portable device,
   wherein,
      the non volatile storage memory is compartmentalized into a transmission memory zone configured to store a file to be transmitted, and a reception zone configured only for the reception or the storage of files;
      the receiver is configured to perform reception into the reception memory zone;
      the transmitter is configured to transmit a file contained in the transmission memory zone; and
      the transmission control system is configured to automatically start, at the recognition of mechanical fitting to the other autonomous portable device, the transmission of a copy of the file stored in the transmission memory zone, to a reception memory zone of the other autonomous portable device, a file stored in the reception zone of the other autonomous portable device being unable to be transmitted via the transmission system, thereby effecting a security function.

11. A method for operating with a system of plurality of autonomous portable devices, each autonomous portable device having the form of a USB key, each autonomous portable device comprising:
   a non-volatile storage memory compartmentalized into a transmission memory zone configured to store a file to be transmitted, and a reception zone configured only for the reception or the storage of files;
   a standalone power supply;
   a transmitter configured to transmit a file to be transmitted, the transmitter comprising a first contact connection port configured to enable mechanical fitting to a contact connection port of another autonomous portable device,
   a receiver configured to receive a file, the receiver comprising a second contact connection port configured to enable mechanical fitting to another contact connection port of the other autonomous portable device,
the method comprising the steps, performed in each autonomous portable device, of receiving into the reception memory zone of the non-volatile storage memory;
   recognizing mechanical fitting to the other autonomous portable device;
   transmitting a file contained in a transmission memory zone of the non-volatile storage memory; and
   automatically starting the transmitting step, responsive to the recognizing step, wherein, a file stored in the reception zone is unable to be transmitted, thereby effecting a security function.

* * * * *